March 19, 1940.  L. S. RILEY  2,193,885
MUSIC CHART
Filed March 11, 1938   3 Sheets-Sheet 1

Inventor
Lester S. Riley
by Francis N. Dakin
Attorney

March 19, 1940.  L. S. RILEY  2,193,885
MUSIC CHART
Filed March 11, 1938   3 Sheets-Sheet 2
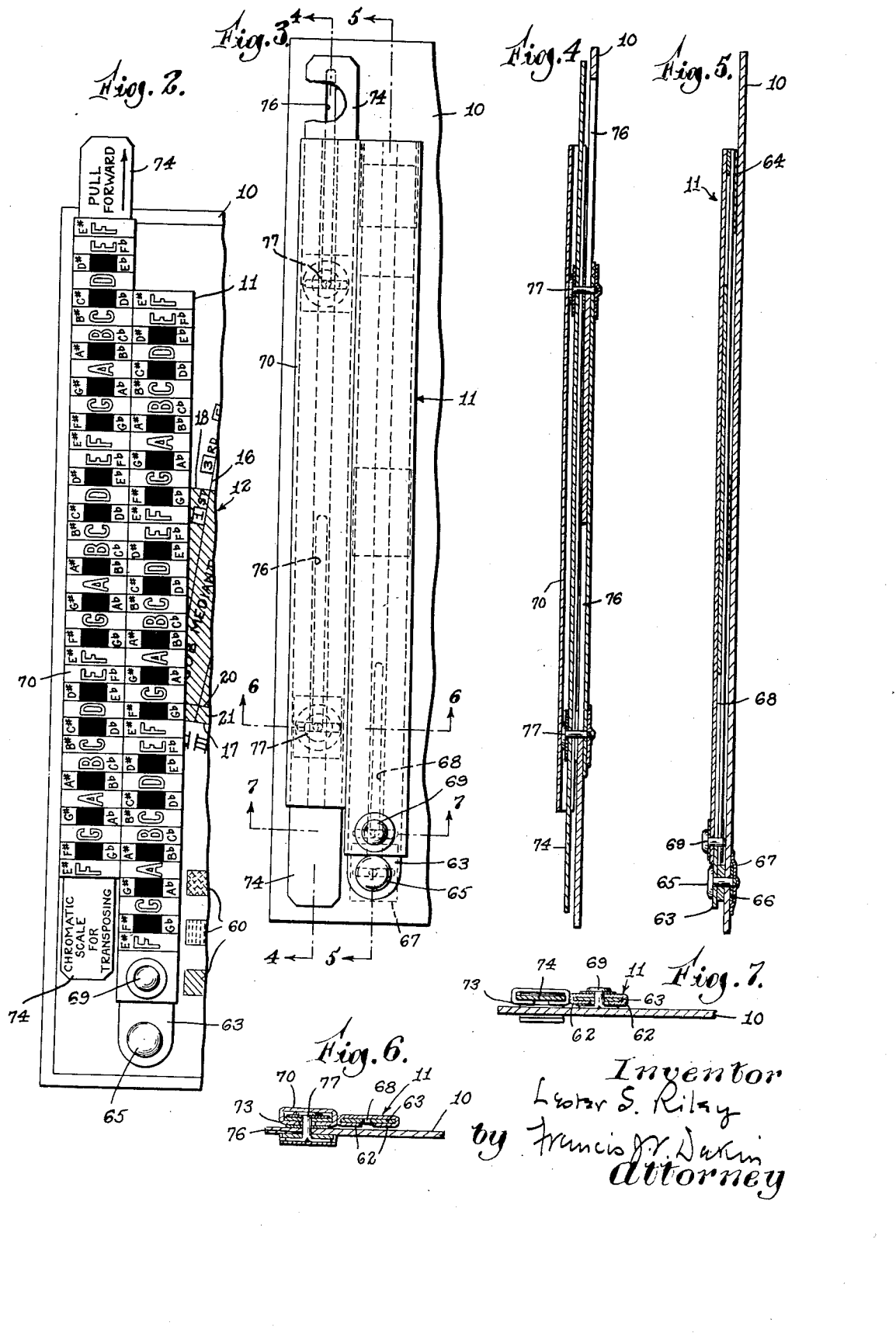

March 19, 1940.  L. S. RILEY  2,193,885
MUSIC CHART
Filed March 11, 1938  3 Sheets-Sheet 3
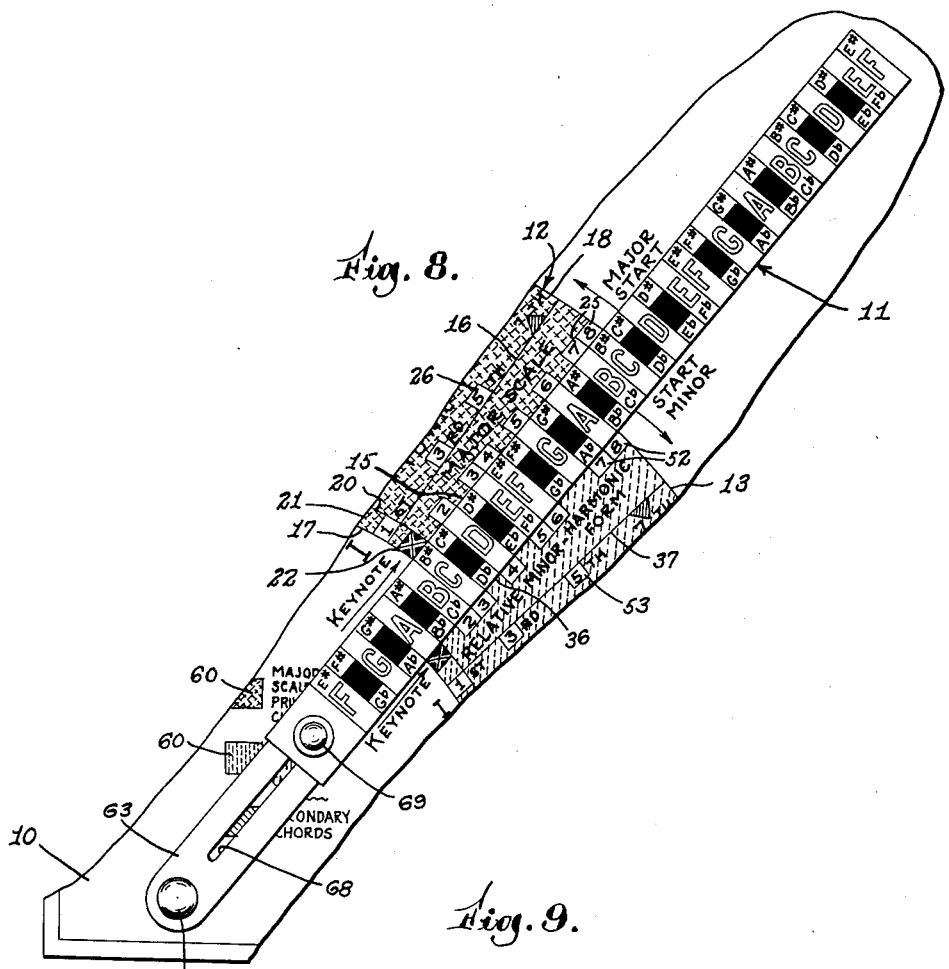
Fig. 8.
Fig. 9.
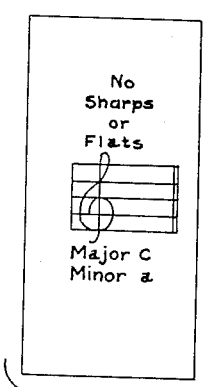
Inventor
Lester S. Riley
by Francis N. Dakin
Attorney Patented Mar. 19, 1940

2,193,885

UNITED STATES PATENT OFFICE 2,193,885

MUSIC CHART

Lester S. Riley, Reading, Mass.

Application March 11, 1938, Serial No. 195,282

2 Claims. (Cl. 84—471)

This invention relates to a music chart for use by students of music.

The principal object of the invention is the provision of a chart of compact and simple form, whereby the formation of any major or minor scale and the chords built within any key may be easily and quickly found.

Another object of the invention is the provision of a chart which will readily enable a student to transpose music accurately from one key to another.

Other objects of the invention will be more specifically set forth and described hereinafter.

My invention contemplates briefly a music chart comprising a tablet of suitable material, having a chromatic scale keyboard mounted on its top face for pivotal and longitudinal movement thereover, and having printed or delineated on said top face note symbols arranged on a plurality of spaced radial lines, for indicating on said keyboard the formation of any major or minor scale and the chords built within any key. Each of the radial lines carries a key symbol and note symbols either for a particular type of scale or a particular type of chords. The symbols on each line are so spaced and arranged that when the chromatic keyboard is pivotally moved into register with any radial line and is adjusted longitudinally in relation to the key symbol on that line, all the notes of either the scale or the chords of that particlar type which are built within the key shown by the key symbol will be indicated on the keyboard by the note symbols on that line.

Preferably, the radial lines are arranged in two groups of arcuate segmental form, one group for the scales and chords of the major keys and the other group for the scales and chords of the minor keys, and these two groups are so arranged in relation to each other that the construction of any major scale and its relative minor scale can be determined from the chromatic keyboard by pivotal movement thereof without longitudinal adjustment.

For transposing music from one key to another, the top face of the tablet may be provided with another chromatic scale keyboard, identical in form with that first mentioned, but so positioned that the latter member may be turned into sidewise engagement with it and adjusted longitudinally for the transposition. When this adjustment has been made, the transposition is clearly indicated and may be followed from the comparison of the two scales, note by note. Preferably, the second keyboard is longitudinally but not pivotally movable.

In the accompanying drawings illustrating the preferred embodiment of my invention, Figure 1 is a plan view of a chart constructed and adapted to be operated in accordance therewith, a portion of the pivotally mounted chromatic scale keyboard being broken out to expose fully the chord segment for major scales;

Fig. 2 is a plan view of a portion of the chart, showing the two chromatic scale keyboards arranged in transposing relation;

Fig. 3 is a plan view similar to Figure 2, but showing the two chromatic scale members in normal position, the keyboards being omitted to show the constructive features of the two members;

Fig. 4 is a longitudinal sectional view on line 4—4 in Figure 3 of one of said scale members;

Fig. 5 is a longitudinal sectional view on line 5—5 in Figure 3, of the other scale member;

Fig. 6 is a cross-sectional view on line 6—6 in Figure 3;

Fig. 7 is a similar view on line 7—7 in Figure 3;

Fig. 8 is a plan view of the central portion of the top face of the tablet, showing the pivotally mounted keyboard in position for finding the formation of major and minor scales; and Fig. 9 is a plan view of a chart of key signatures for major and minor scales.

Figure 1:
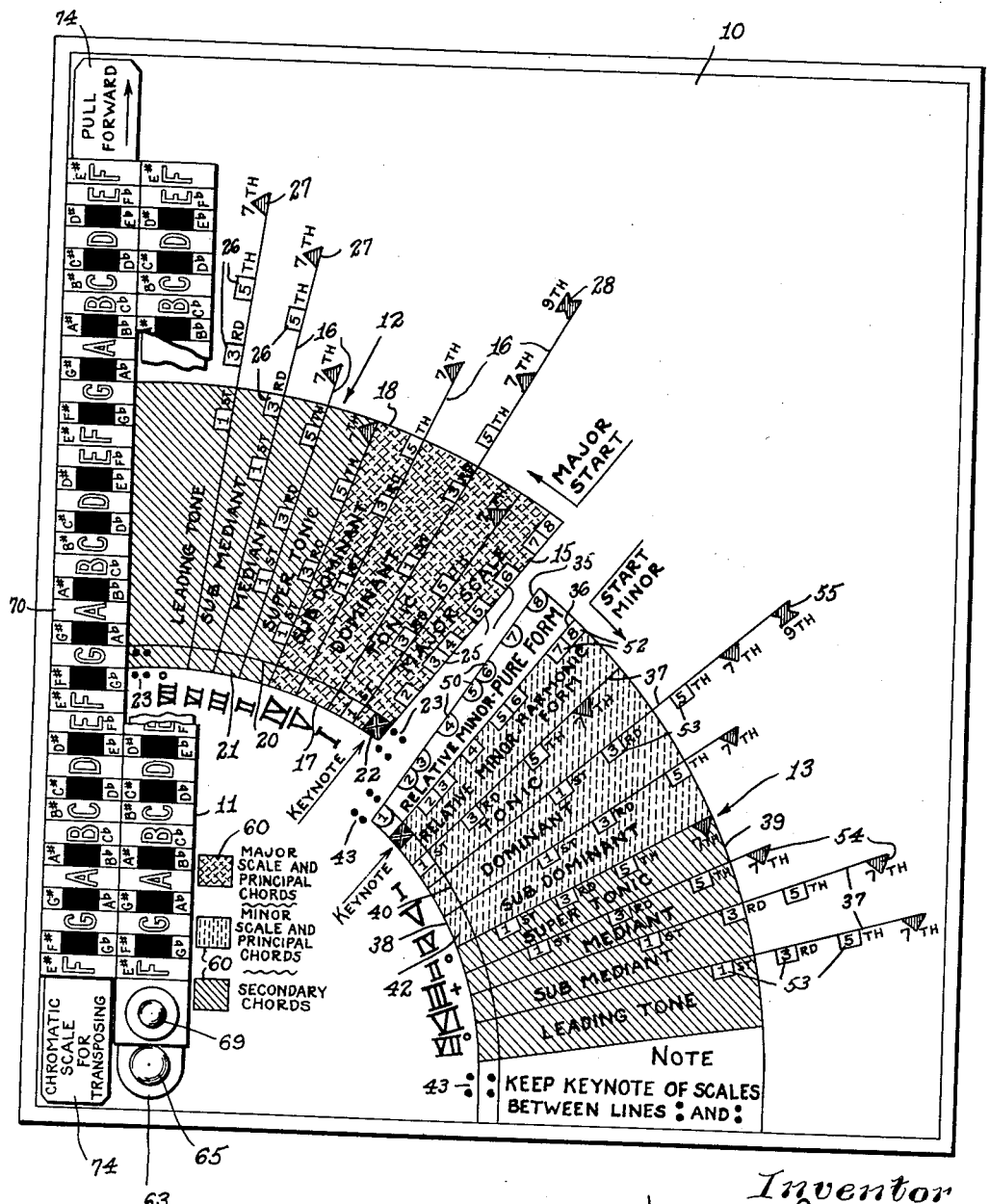

Referring to the drawings, particularly to Figure 1, 10 designates a tablet of stiff material such as cardboard, preferably rectangular in form; 11, a chromatic scale keyboard mounted on the top face of said tablet, preferably in the lower left-hand corner, for pivotal and longitudinal movement over said face; and 12 and 13, two groups of note symbols printed or delineated on said top face for indicating on said keyboard the actual notes in any desired scale or chord. The first of these groups is for major scales, and the second for minor scales, and in each group, the symbols are arranged on spaced apart radial lines, each of said lines being limited to symbols for designating a scale or a particular type of chord. Preferably, the radial lines of each group are arranged with their inner ends lying within an arcuate segment, the center of which coincides with the pivotal center of the keyboard 11. The two segments are radially in slightly offset relation to each other, for reasons to be hereinafter explained, but together, they form approximately a segmental quadrant across the face of the tablet.

The major group 12 comprises a radial line 15 carrying symbols for the major scales, and seven other radial lines 16 carrying symbols for seven different types of chords. These lines are adapted to register with the upper edge of the keyboard 11 as it is moved pivotally over the face of the tablet. The inner portions of the radial lines are enclosed between two arcs 17 and 18 having a common center coinciding with the pivotal center of the keyboard 11, which arcs form an arcuate segment beginning adjacent the center of the tablet with the line 15, and extending to adjacent the left-hand side thereof. Preferably, the width of the segment is equal to an octave on the keyboard and, therefore, some of the radial lines extend beyond the outer arc 18.

Along the inner margin of the major segment is formed, by a curved line 20 parallel with the arc 17 and spaced inwardly from it a distance equal to one key on the keyboard 11, a key note path 21, which is designated on the tablet by a symbol 22 on the radial line 15. This path governs the arrangement of the symbols on the various radial lines because the scales and chords all bear fixed relations to the key notes. Symbols such as pairs of dots 23 may be provided at the two ends of the path for emphasizing the function of the path.

The first radial line 15 in the major group, which is also the end line of the segment, carries symbols 25 for indicating on the keyboard the upper seven notes of the major scale in whatever key is indicated by the key note symbol 20, the key note being the first note of the scale. The symbols 25 may be of any distinctive form but are shown as small squares, each enclosing a numeral indicating its sequence in the scale. Since the radial lines in this group are adapted to register with the upper edge of the keyboard, the symbols are arranged on the upper sides of the lines.

The seven radial lines 16 divide the major segment into eight sub-segments, each of which is marked with words identifying the symbols therein. The first sub-segment is marked "Major scale", and the other seven devoted to chords are marked in the following order: "Tonic", "Dominant", "Sub-dominant", "Super-tonic", "Mediant", "Sub-mediant", and "Leading tone". Each of the radial lines 16 carries three symbols 26 of the same form as the symbols 25 for indicating the 1st, 3rd and 5th notes of each type of triad, and for the 7th note, a symbol 27 in the form of a triangle, colored red and designated "7th", and where a 9th note is used, as on the dominant line, a symbol 28, simulating an hour-glass, is employed, with the designation "9th." These symbols are all arranged on the various lines in their proper positions with the proper spacing to indicate, in each case, the chords of the type to which the particular line is limited in the key which is indicated on the keyboard 11 by the key note path 21.

The lower group 13 for minor scales and chords is, in relation to the upper group, offset radially toward its center a distance equal to three half notes or three keys on the keyboard 11. It is of the same form as the first group with the exceptions that it contains an additional minor scale and that the scales and chords are in reversed order with the symbols below the lines. It includes nine spaced apart radial lines arranged from the center of the tablet downwardly, two of which 35 and 36 are for the two forms of minor scale and the other seven of which 37 are for different types of chords. The inner portions of these lines are enclosed between two arcs 38 and 39 having a common center coinciding with the pivotal center of the keyboard 11, which arcs, with the end radial lines, form an arcuate segment, the width of which is equal to an octave on said keyboard. As in group 12, in the majority of cases the radial lines project beyond the outer arc 39. This segment extends from adjacent the center of the tablet downwardly to adjacent its bottom edge.

Along the inner margin of the segment is formed, by a curved line 40 parallel with the arc 38 and spaced apart from it inwardly a distance equal to one note on the keyboard 11, a key note path designated by a symbol 42. This path is cut into rectangular areas by the radial lines which serve as key note symbols, and at both ends of the path, symbols, such as pairs of dots 43, may be used for calling attention to the path.

The first line 35 carries symbols 50 for indicating on the keyboard the notes of the relative minor scale of the pure form, and since this form is used only in certain contingencies, as hereinafter explained, a different form of symbol is employed; namely, a half circle, within which is a numeral indicating the sequence of the note in the scale. The next line 36 carries symbols 52 for the notes of the relative minor scale of the harmonic form, which corresponds in group 13 to the line 15 for the major scale in group 12. This scale is the foundation for the seven types of chords in the minor group. The symbols 52 are in the form of small squares, each enclosing a numeral indicating its sequence in the scale. Next, the seven chord lines 37 appear and are marked in the following order, "Tonic", "Dominant", "Sub-dominant", "Super-tonic", "Mediant", "Sub-mediant", and "Leading tone." Each radial line 37 carries three symbols 53 of the same form as the symbols 52 which are marked respectively for the 1st, 3rd and 5th notes of each type of triad, and for the seventh note, a symbol 54 in the form of a triangle, colored red and designated "7th", and where a ninth note is used, as on the "dominant" line, a symbol 55, simulating an hour-glass, is used with the designation "9th". These symbols are similar to those shown in the major group for the various chords and are used in the same manner for indicating notes on the keyboard.

For further identifying the various types of chords, various sized Roman numerals are printed on the face of the tablet adjacent the inner ends of the sub-segments of each group. A chord may be built on any member of a major or minor scale, as for instance, a triad, by adding the third and fifth notes above it in the scale. Not all triads formed on the members of the major scale are major triads, there are some major, some minor, and one diminished, and in the minor keys, there are major, minor, diminished, and one augmented triads. Large Roman numerals are used for the major triads, small for minor triads, small with a small circle at the upper right for a diminished triad, of which the outer note is a half tone less than a perfect fifth. For an augmented triad, the outer note of which is a half tone more than a perfect fifth, a large numeral with a plus sign is used.

To distinguish the major and minor scales from each other and the principal chords from the secondary chords, the segments may be divided into fields of different colors which may be arbitrarily chosen. For example, one arrangement is indicated in the drawings in which the sub-segments containing the radial lines for the major scale and principal chords are colored orange, the subsegments for the minor scale and principal chords purple, and all the secondary chords, both in the major and minor segments, greeen. Similarly colored rectangles 60 with accompanying legends on the face of the tablet serve as a guide explaining the color arrangement. The relative minor scale of the pure form is preferably not colored because it plays a subordinate part only on the chart as the foundation for the harmonic form.

The chromatic scale keyboard preferably simulates a pianoforte keyboard of three octaves in length but in addition, carries the various note designations on the keys. It may be of any suitable form of construction, but is shown as comprising an elongated strip of stiff paper or cardboard having its two longitudinal edge portions 62 folded around and adapted to enclose loosely an elongated flat strip 63 of stiff material, the edges 62 being fastened together under the said strip by any suitable means, such as transverse pieces 64 adhesively secured to said edges (Fig. 5). The strip 63 is pivotally mounted at its free end on a headed pin 65 fixed preferably in the lower left-hand corner of the tablet. The end of the pin is bifurcated to form two prongs which are bent outwardly over a washer 66 on the bottom face of the tablet and secured in that position by a paper washer 67. The keyboard 11 is longitudinally movable on the pivoted member 63 and for limiting this movement, the latter is provided with a longitudinal slot 68, and the former with a pin 69 of the same form as pin 65 having its shank in said slot. This construction permits the keyboard 11 to be swung pivotally over the face of the tablet and registered with the various radial lines and also permits it to be moved longitudinally on its support for registering any desired note on the keyboard with the key note path in either of the symbol segments.

For transposing music from one key to another, a second chromatic scale keyboard 70 is arranged, preferably along the left-hand edge of the tablet in such posititon that the keyboard 11 may be turned pivotally into side engagement with it. Although the keyboard 70 may, if desired, be printed directly upon the face of the tablet in that location, yet I prefer to provide one which may be adjusted longitudinally, and to accomplish this end, the keyboard is printed or delineated upon the top face of an elongated strip of suitable material, the longitudinal edges 73 of which are turned around to enclose a strip 74 and adhesively fastened to the bottom face thereof. For permitting longitudinal movement of the keyboard, the tablet is provided with a pair of elongated slots 76 and the strip 74, with a pair of headed pins 77 having their shanks passing through said slot and their bifurcated ends turned outwardly over the bottom face of the tablet. Any form of fastening devices may be used for mounting the two keyboards on the top face of the tablet. Preferably, the slots in the tablet are of a length permitting longitudinal movement of the keyboard 70 for approximately the length of an octave on the keyboard which will be found sufficient for all necessary adjustments. The strip 74 projects at both ends of the keyboard and these projections serve as handles for longitudinal adjustment of the keyboard 70.

In use, a chart made in accordance with my invention enables a student of music to find almost instantly, by a proper manipulation of the keyboard 11, the formation of any major or minor scale and the chords built within any scale. When the two keyboards on the chart are properly adjusted in relation to each other, transposition from one key to another is immediately indicated and can be followed by the student. To find any major scale, the keyboard 11 is adjusted in central position between the two segments with the key note of the scale in register with the key note path, as shown in Figure 8, in which position its upper edge will be in register with line 15 and the major scale symbols, and its lower edge in register with line 36 and the symbols of the harmonic form of the relative minor scale. These two scales form the starting points of the two segments because they are each of the foundation for the formation of all chords in their respective segments. In Figure 8, the keyboard is shown as adjusted with the key marked "C" in register with the key note path, and, therefore, the symbols indicate the notes of the key of C. The minor scale relative to the major scale key of C is the key of A minor, which starts three half tones lower than the key of C. Since the minor segment is offset lower down the scale a distance equal to three keys on the keyboard, the formation of the minor scale of A is shown by the symbols in register with the bottom edge of the keyboard.

Since many of the notes on said keyboard 11 have both a sharp and a flat designation, it will be necessary for the student to select, in each of such cases, one of these designations in preference to the other; and this choice is determined by the fact that in the scale, each letter of the alphabet from A to G inclusive, or one of its relatives (sharp, flat, double sharp, or double flat) must be present in every scale. For example, in A-major, when the keyboard is adjusted with the "A" in register with the key note path, the symbol marked "3" will indicate on the keyboard a black key marked "C#" and "Db". If the student selects Db, he will have spelled incorrectly in musical grammar, for he will have D and Db in the scale, but no relative of C, although it will sound the same musically. Furthermore, one would hardly expect to find a flat in the key of three sharps. So this eliminates Db, and the proper note is C#. By the same method of selection, the student will find that "6" and "7" are sharps, so the correct spelling of the scale is A B C# D E F# G# A. A simple expedient which will prevent mistakes in this respect in the use of my chart is to write down the letter successions from the alphabet, as mentioned above, then add the sharps and flats, as indicated by the keyboard 11. For instance, using this expendient, if he desires the scale of six sharps major, the student refers to his chart of key signatures (Figure 9) and ascertains that his key note is F#. The keyboard 11 is then moved into central position and adjusted to bring F# under the key note. The note of the scale indicated by the symbol "7" is F, a white key, but that would leave the major scale without any representative of E; consequently, the proper 7th note must be called E#.

The spelling of the minor scales by the use of my chart calls for somewhat more care, because the raised 7th of the harmonic form requires a sharp to be written into some "flat" keys and occasionally a white key must be given its double sharp name. For example, in spelling "d" minor, the keyboard 11 is adjusted to bring "D" over the key note path of the harmonic minor form. The symbol numbered "6" then indicates a note on the keyboard which is marked Bb and A# and the symbol marked "7" indicates a note on the keyboard marked C♯ and D♭. These two notes in the scale will be B♭ and C♯ in order to make up the usual successions of letters from the alphabet. The question then arises how there can be a sharp in the minor scale of one flat. If the keyboard is pushed upwardly into alignment with the pure form, it will appear that the symbol marked "7" is plain C, which leads to the conclusion that the 7th of the harmonic form is the 7th of the pure raised a half tone, so it must take its name from that. Also the last three notes cannot be B♭ D♭ D, for, here again, there would be two representatives of D but no relative of C; therefore, the correct spelling of the harmonic form is D E F G A B♭ C♯ D.

To illustrate the use of my chart for spelling scales in which double-sharps occur, as, for instance, in G♯ minor, the student first writes down the letter names in their order, g a b c d e f g. The seventh note indicated on the keyboard is "g". Obviously, "g" and g♯ cannot be used in the same scale. In such a case, reference is made to the pure form. There, the "7" is f♯. The student will readily see that if the seventh of the pure form is f♯, that letter name must be retained, even when the seventh is raised a half tone in the harmonic form. So here, f♯ becomes f♯♯, not "g". Thus, the complete spelling of the harmonic form is, g♯ a♯ b c♯ d♯ e f♯♯ g♯.

In order to ascertain the note formation of any major or minor chord of any type in any key, the keyboard 11 is turned pivotally to the sub-segment designated as of that type. If the chord is in the major group, the upper edge of the keyboard is registered with the proper radial line; if it is in the minor group, then the bottom edge of the keyboard is so registered. At the same time, the keyboard is adjusted longitudinally to bring the key letter of the scale in which the chord appears in register with the key track. As soon as these adjustments have been made, the note formation of the desired chord, either triad, seventh, or ninth if there is one, is indicated on the keyboard by the chord note symbols on the radial line with which the keyboard is in register.

When a student is given an exercise in harmony which requires a figured bass to be harmonized, he then makes use of the Roman numerals which appear on the chart along the inner edges of the two segments. In such an exercise, the bass is not written out but is suggested by Roman numerals showing the chords to be played in the key in which the piece is written. If, for instance, asked to harmonize a figured bass in the key of D flat major, the student found that it called for a

*VII*;

he could, by adjusting the keyboard to place D flat in the key note path, instantly find this chord in the sub-segment designated by this numeral.

My chart is particularly useful to students who must frequently transpose, because it readily indicates both the scale members of the new key and all the chords. To use it to the best advantage for the transposition of notes foreign to the key and chromatically altered chords, the keyboard 11 should first be adjusted with the key note of the desired key in the key note path and then be turned pivotally into sidewise engagement with the keyboard 70, which is adjusted longitudinally with the first letter of the key in which he is reading in alignment with the keynote on keyboard 11.

For example, in transposing from D major to F♯ major, the keyboard 11 is first adjusted longitudinally to place F♯ in register with the key note path 21 in the major segment, and then it is moved into sidewise engagement with the keyboard 70 which is then adjusted longitudinally so that key note D is directly above F♯ of keyboard 11. The two keyboards are then in the relative positions shown in Figure 2, and by looking from one keyboard to the other, the student can instantly find the notes in the new key corresponding to the notes to be transposed.

It will be apparent from the foregoing that the chart of my invention is of extreme simplicity, both in operation and in use, and that it enables the student to obtain the information which he desires almost instantly and with little effort. It is of special advantage in the study of harmony and in analysis, notation and arrangement of music. At the same time, the chart presents to students in a concrete form the pattern (whole and half tones, and tones and a half) on which scales are constructed. By familiarizing the student with the principal chords, he is enabled more easily to memorize them. It further helps the student in the recognition of modulation and cadences.

It is to be understood that my invention is not to be limited to the specific form herein shown and described, since it may be embodied in other forms within the scope of the invention as defined in the following claims.

What I claim is:

1. A music chart comprising a tablet of stiff material, such as cardboard, a strip member mounted at one end on a fixed pivot on the top face of said tablet, a chromatic scale keyboard carried by said member for longitudinal movement thereon, said top face having delineated thereon note symbols carried by spaced radial lines arranged in major and minor groups of approximately arcuate segmental form having centers coinciding with the pivotal axis of said keyboard and each of said groups having a key note path along its inner margin, the radial lines in said major and minor groups being adapted to register with the upper and lower edges respectively of said keyboard and each of said lines carrying note symbols for indicating on said keyboard, when in register therewith, the notes of either a scale or a particular type of chord in the key indicated by the key note path; said two groups being offset in relation to each other a distance equal to three notes on said keyboard for permitting said keyboard, when adjusted in either group for determining the notes of a scale or chord in a certain key, to be turned pivotally without longitudinal adjustment to the corresponding line in the other group for determining in the latter group the scale or chord which is relative to the scale or chord in the first group.

2. A music chart comprising a tablet of stiff material such as cardboard having mounted on its top face two chromatic scale members, each comprising a narrow strip member and a second member mounted on and loosely enclosing said strip member and longitudinally movable thereon, one of said strip members being fastened at its two ends to said tablet and the other of said strip members being attached at one end only to a fixed pivot in said tablet adjacent to said one member in such position as to permit edgewise engagement between said two chromatic scale members, each of said second members having its top face marked to simulate a pianoforte keyboard, the keys of which are provided with note designations, and said top face having delineated thereon a plurality of lines substantially radial to said pivot, each of said lines carrying a key note and chord note symbols for a particular type of chord, said symbols being adapted to register with a side edge of said pivoted strip member for indicating on the keyboard thereof the various notes making up the chord in the key indicated by the key note symbol, edgewise engagement of the two scale members then indicating the corresponding notes in a different key on the keyboard of said non-pivoted strip member registering with the key note of the keyboard of said pivoted strip member.

LESTER S. RILEY.